United States Patent [19]
Stone

[11] Patent Number: 5,384,877
[45] Date of Patent: Jan. 24, 1995

[54] PASSIVE TEMPERATURE-INSENSITIVE FABRY-PEROT ETALONS

[75] Inventor: Julian Stone, Rumson, N.J.

[73] Assignee: AT&T Corp., Murray Hill, N.J.

[21] Appl. No.: 80,458

[22] Filed: Jun. 21, 1993

[51] Int. Cl.⁶ .............................................. G02B 6/38
[52] U.S. Cl. ....................................... 385/70; 385/27; 385/25; 385/73
[58] Field of Search .................. 385/20, 27, 68, 31, 385/50, 72, 70, 25, 73, 12; 372/6, 20, 94; 356/352; 359/127, 578

[56] References Cited

U.S. PATENT DOCUMENTS

| | | | |
|---|---|---|---|
| 4,830,451 | 5/1989 | Stone | 385/31 |
| 4,861,136 | 8/1989 | Stone et al. | 350/96.3 |
| 5,061,857 | 10/1991 | Thompson et al. | 385/12 |
| 5,073,004 | 12/1991 | Clayton et al. | 385/27 |
| 5,212,745 | 5/1993 | Miller | 385/73 X |
| 5,212,746 | 5/1993 | Miller et al. | 385/73 X |

OTHER PUBLICATIONS

"Pigtailed High-Finesse Tunable Fibre Fabry-Perot Interferometers With Large Medium and Small Free Spectral Ranges" J. Stone and L. W. Stulz Electronics Letters, Jul. 16, 1987, vol. 23, No. 15, pp. 781–783.

"Passively Temperature-Compensated Fibre Fabry-Perot Filter and its Application in Wavelength Division Multiple Access Computer Network" C. M. Miller and F. J. Jenniello, Electronics Letters, Dec. 6, 1990 vol. 26, No. 25, pp. 2122–2123.

*Primary Examiner*—John D. Lee
*Assistant Examiner*—Phan Thi Heartney

[57] ABSTRACT

Both the fiber and the bulk Fabry-Perot etalons can be made temperature insensitive by the addition of a compensator element. This element adjusts the optical length of the air-gap in the etalon cavity so as to compensate for any changes in the optical length of the fiber or the etalon slab due to ambient temperature changes.

11 Claims, 3 Drawing Sheets

5,384,877

PASSIVE TEMPERATURE-INSENSITIVE FABRY-PEROT ETALONS

FIELD OF THE INVENTION

The invention relates to passive arrangements for tuning Fabry-Perot etalons, and for making the resonant wavelengths of such devices insensitive to temperature changes.

BACKGROUND OF THE INVENTION

In wavelength-division multiplexed systems, there is a need for filters capable of separating the different wavelength channels. As these filters must often operate at different locations, there is a further need for wavelength standards in order to avoid channel collisions and to maintain system transparency. Specifically, such filters must be capable of maintaining their preset frequencies in environments in which the temperature may change. While Fabry-Perot etalons are convenient for this purpose in lightwave systems, they have the disadvantage that they tend to be temperature sensitive. One solution to this problem is to design filters that can be preset to a desired wavelength, and then place them in a temperature-controlled environment in order to avoid temperature-dependent effects. A preferred alternative approach would be to design an etalon that is passively compensated for temperature fluctuations solely by virtue of its physical configuration. Such a filter is then completely passive, and does not require heating elements and active controls to maintain its wavelength setting in an environment in which the temperature tends to vary.

In U.S. Pat. No. 4,861,136, an etalon is disclosed which comprises a wave-guiding portion and a non-waveguiding (i.e., air gap) portion. It is an advantage of such an etalon that its frequency can be readily tuned simply by changing the length of the gap. However, as noted above, the optical length of the cavity also varies as a function of temperature, thereby detuning the filter.

Accordingly, it is the object of the present invention to provide passive temperature compensation in a Fabry-Perot etalon.

BRIEF DESCRIPTION OF THE INVENTION

The optical length and, hence, the resonant wavelength of a Fabry-Perot etalon tends to change as a function of temperature. In accordance with the present invention, compensators are provided that serve to counter this change in optical wavelength. In an etalon comprising a length of fiber and an air gap, the compensators modify the length of the air gap in a sense to cancel any change in the length of the filter.

In a typical embodiment, the compensators are lengths of rotary connector capillaries in which the optical fiber is embedded. The lengths of the capillaries are precisely maintained by means of a spacing sleeve.

In a second embodiment of the invention, passive temperature compensation is obtained in a Fabry-Perot slab etalon.

Passive tuning means are disclosed for presetting the etalon to the desired wavelength.

DETAILED DESCRIPTION

Figure 1:
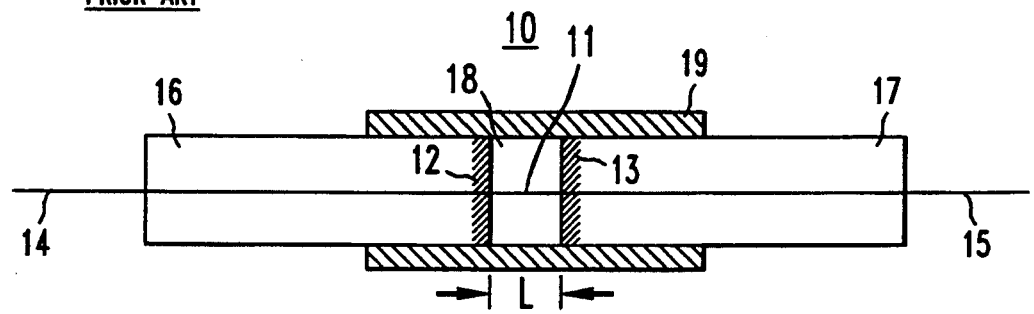
FIG. 1 shows a prior art Fabry-Perot etalon comprising a length of optical fiber.

Referring to the drawing, FIG. 1 shows a prior art fiber Fabry-Perot etalon (FFP) 10 comprising a length of optical fiber 11 disposed between a pair of partially reflecting surfaces 12 and 13. Input and output fibers 14 and 15 couple optical signals into and out of the etalon.

All the fibers are shown embedded in lengths of precision rotary connector capillaries 16, 17 and 18. The entire assembly is typically maintained in alignment by means of a split alignment sleeve 19.

The temperature sensitivity of such a structure is due to the dependence of the optical length nL of the etalon on the temperature T, as given by $$\frac{\partial(nL)}{\partial T} = \left(n\alpha + \frac{\partial n}{\partial T}\right)L \tag{1}$$

where:
n is the index of refraction of the fiber core;
$\partial n/\partial T$ is the temperature coefficient of n;
$\alpha$ is the thermal expansion coefficient of the fiber; and
L is the physical length of the fiber.
For silica fibers, to a good approximation,
$n = 1.46$
$\partial n/\partial T = 1.0 \times 10^{-5} C^{-1}$ and
$\alpha = 0.5 \times 10^{-6} C^{-1}$.

This results in a temperature dependence of the resonant frequency of the etalon at 1.5 $\mu$m wavelength of 1.4 $GHzC^{-1}$ for any length of etalon.

In addition to its inherent temperature sensitivity, tuning the cavity requires some mechanism for changing the optical length of the cavity.

One illustrative tuning arrangement employing piezoelectric elements is disclosed in an article by J. Stone and L. W. Stulz entitled "Pigtailed High-Finesse Tunable Fibre Fabry-Perot Interferometers With Large, Medium And Small Free Spectral Ranges," published in the Jul. 16, 1987 issue of *Electronic Letters*, Vol. 23, No. 15, pp. 781-783. The problem with such a tuning arrangement is that the piezoelectric elements themselves are temperature sensitive, thus further complicating the problem.

Figure 2:
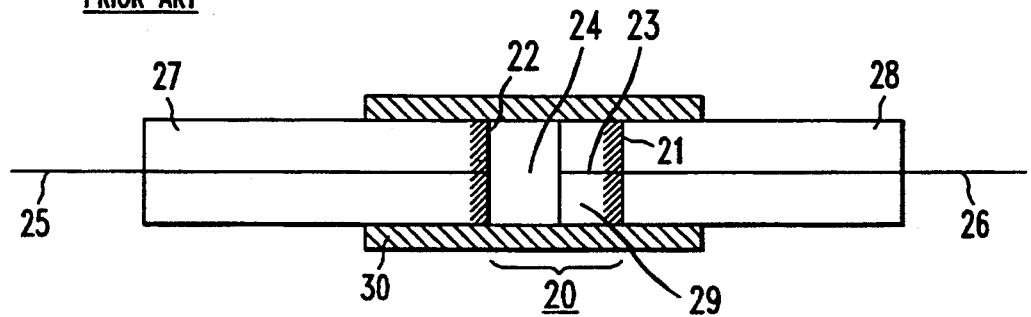
FIG. 2 shows a prior art Fabry-Perot etalon comprising a length of optical fiber and an air gap.

FIG. 2, now to be considered, shows a modification of the simple structure of FIG. 1, designed to facilitate tuning. In this prior art structure (see U.S. Pat. No. 4,861,136, assigned to applicant's assignee), the etalon includes both a section of fiber and a non-guiding portion, or gap. Referring more specifically to the figure, the etalon cavity comprises the region 20 bounded by the partially reflecting surfaces 21 and 22. A portion of region 20 includes a length of fiber 23. The balance of the cavity is the air gap 24.

Coupling into and out of the etalon is by means of fibers 25 and 26.

As in FIG. 1, all the fibers are shown embedded in lengths of precision rotary connector capillaries 27, 28 and 29, and the entire assembly is maintained in proper alignment by means of a split alignment sleeve 30.

While the etalon shown in FIG. 2 can be conveniently tuned by changing the length of gap 24, it can also be just as easily detuned due to the temperature sensitivity of fiber 23, and the capillaries 27 and 28. If, for example, the wavelength were to increase, the length of fiber 23 would also increase, thereby decreasing the length of the gap 24. Simultaneously the capillaries 27 and 28 would also increase thereby tending to reduce the length of gap 24.

However, the effect of any change in the lengths of the capillaries is unpredictable. inasmuch as they are not fixed at any point along their lengths relative to the air gap and are, therefore, free to move in either longitudinal direction. As a consequence, the temperature sensitivity of this structure is unpredictable.

Figure 3:
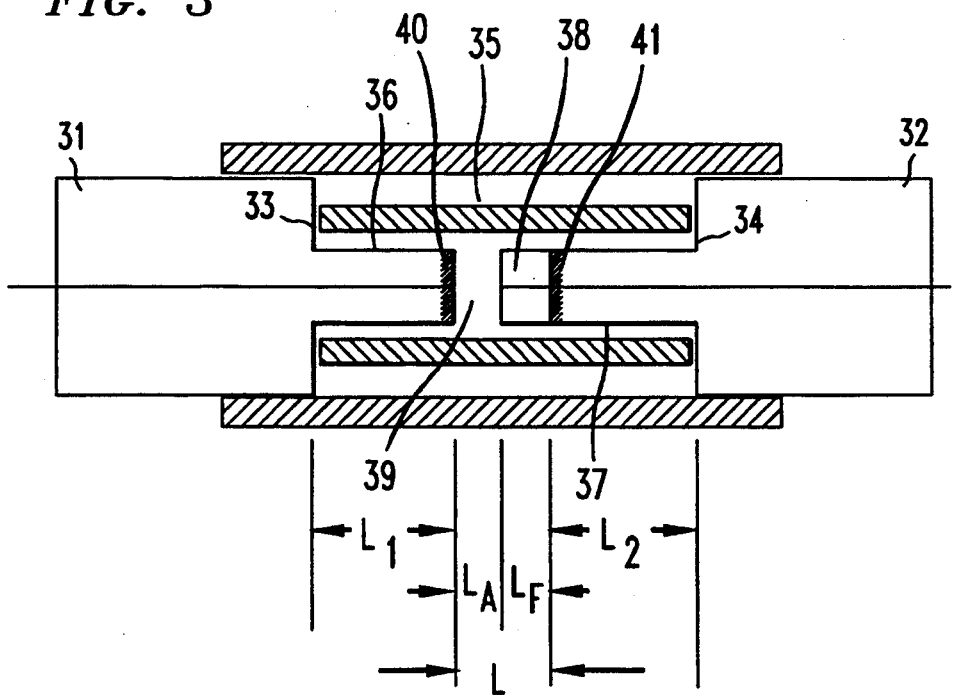
FIG. 3 shows a passive, temperature-insensitive Fabry-Perot fiber etalon in accordance with the present invention including passive compensators and a spacing sleeve.

FIG. 3, now to be considered, illustrates a passive, temperature-insensitive Fabry-Perot etalon in accordance with the present invention, where the term "passive," as used herein, means the absence of any externally applied voltages or currents. Basically, the structure is designed such that any change in the optical length of the etalon, as a function of temperature, is compensated by the thermal changes in other lengths of glass. To accomplish this compensation, the rotary capillaries 27 and 28 of the prior art etalon illustrated in FIG. 2 are ground down to form a region of reduced diameter, or annular step, and a spacing sleeve is placed between the corners of the step to fix the relative positions of the two capillaries and the etalon. This is illustrated in FIG. 3 wherein the rotary capillaries 31 and 32 include annular steps 33 and 34, respectively. A spacing sleeve 35 is placed between, and in contact with the steps. The effect of this arrangement is to fix the positions of the reduced diameter portions of the capillaries relative to the etalon. As will be explained herein below, these provide the compensating components for the etalon. The latter include a guided portion, provided by fiber length 38, and an unguided portion provided by gap 39. Reflective surfaces 40 and 41 define the physical length L of the cavity. The optical length OL of the etalon cavity is $$OL = nL_F + L_A \tag{2}$$

where:
$L_F$ is the length of the fiber;
$L_A$ is the air gap; and
n is the refractive index of the fiber.
The length of the spacing sleeve $L_I$ is $$L_I = L_1 + L_2 + L_F + L_A \tag{3}$$

where:
$L_1$ and $L_2$ are the lengths of the reduced diameter regions 36 and 37 of the capillaries.

When the temperature changes, e.g. increases, the physical length of the fiber increases, thereby decreasing the length of the air gap. In addition, the refractive index of the fiber material changes. Simultaneously, the length of the sleeve 35 increases as do the lengths of the reduced diameter regions 36 and 37. The resulting net change in the optical length of the etalon is given by $$\frac{\partial(OL)}{\partial T} = \left[ (n-1)\alpha_F + \frac{\partial n}{\partial T} \right] L_F + \alpha_I L_I - \alpha_G(L_1 + L_2) \tag{4}$$

where:
$\alpha_F$ is the expansion coefficient of the fiber;
$\alpha_I$ is the expansion coefficient of the spacing sleeve;
$\alpha_G$ is the expansion coefficient of the capillaries.
The change of resonant wavelength with temperature is $$\frac{\partial \lambda}{\partial T} = \frac{\partial(OL)}{\partial T} \cdot \frac{\lambda}{L_F} \tag{5}$$

where:
$\lambda$ is the wavelength.

It will be noted that equation (4) includes both positive and negative terms. Equation (4), therefore, can be set equal to zero, provided $\alpha_I$ is not too large, and a relation among the parameters determined for which there is no net change in the optical length of the etalon as the temperature changes.

Figure 4:
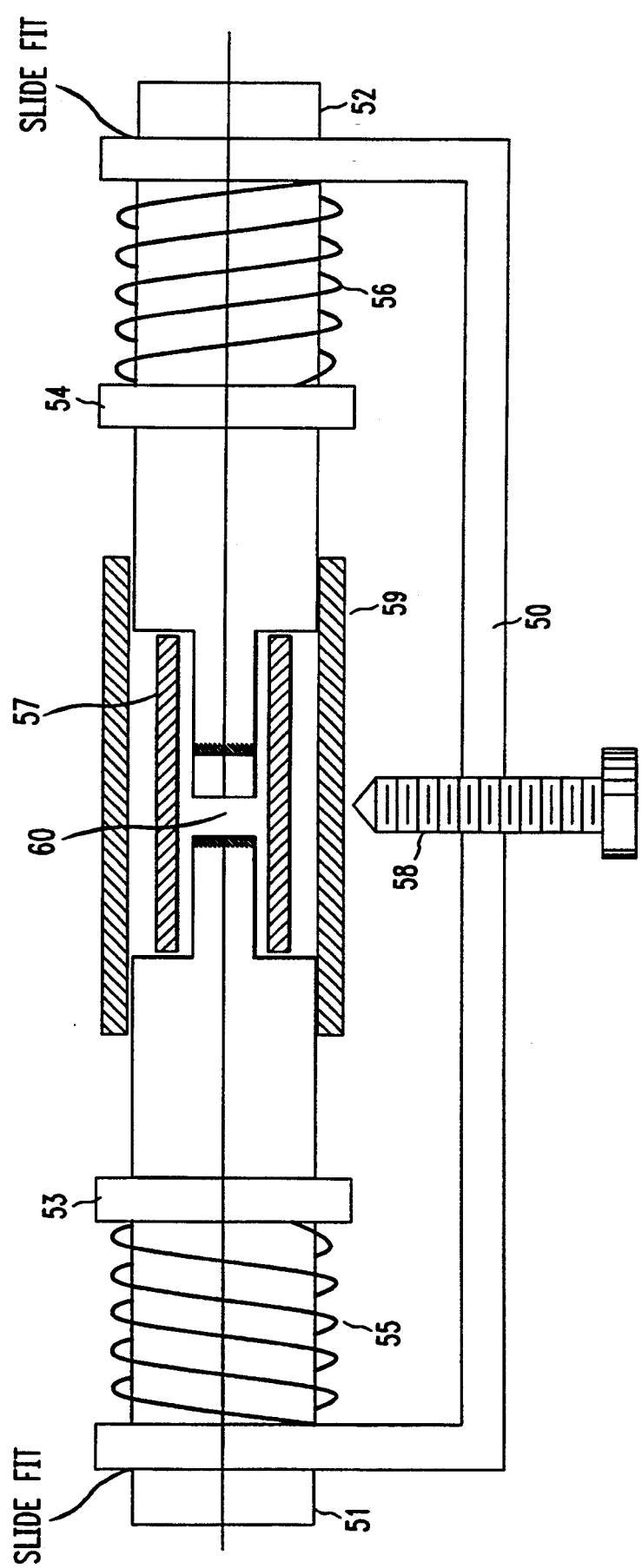
FIG. 4 shows an arrangement for maintaining the desired contact between the spacing sleeve and the compensators, and for providing a means for pretuning the etalon to its desired wavelength.

FIG. 4 shows an arrangement for maintaining the desired contact between the spacing sleeve and the compensators, and a passive tuning mechanism for pretuning the etalon to its desired wavelength. In this illustrative embodiment, the tuner comprises an assembly bracket 50 which makes a slide fit with capillaries 51 and 52. The latter are provided with shoulders 53 and 54. Springs 55 and 56, placed between the bracket arms and the capillary shoulders, force the capillaries against the spacing sleeve 57. Tuning is accomplished by means of a threaded screw 58, pushing against the alignment sleeve 59. This has the effect of tilting the etalon mirrors and thereby changing the optical length of the cavity. This is accomplished by rotating the capillaries 51 and 52 about axes perpendicular to the plane of the figure at the slide fits. Since the change in the length of the air gap 60 required to cover a free spectral range is only half of the optical wavelength, very little rotation of the capillaries is required. Hence, the degradation due to tilting of the mirrors is negligible.

It will be noted that inasmuch as both the tuning and compensation are accomplished with passive elements, the etalon can be preset at the factory, potted, if desired, and requires no further adjustments or attention when placed into service.

Figure 5:
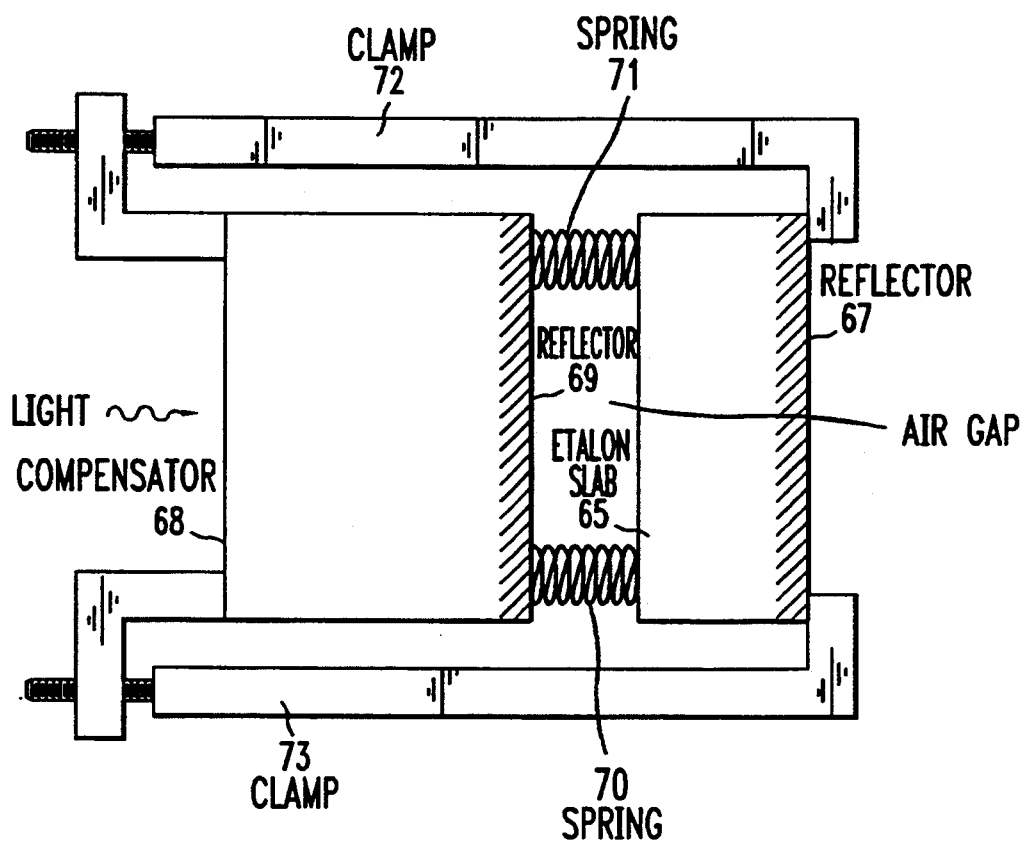
FIG. 5 shows a passive, temperature-compensated Fabry-Perot slab etalon in accordance with the present invention.

FIG. 5 illustrates the application of the principles of the present invention to a bulk etalon. In this embodiment, the cavity region includes a slab 65 of transparent material, such as silica, and an air gap formed between slab 65 and a second slab of glass 68. The latter slab is the thermal compensator, as will be explained herein below. Partially reflecting surfaces 67 and 69 on the outside surface of slab 65 and the inside surface of slab 69 respectively define the resonant cavity.

The air space between slabs 65 and 68 is maintained by means of springs 70 and 71 or an annular ring of an elastic material. The entire assembly is held together by means of clamps 72 and 73.

As in the case of the fiber etalon, as the temperature changes, e.g., increases, slab 65 expands and its refractive index n increases. These changes increase the optical length of the cavity.

Simultaneously, however, the increase in the size of the slab decreases the width of the air gap. This decreases the optical length of the cavity. While this compensates somewhat for the increase produced by the slab, it is generally insufficient to fully compensate. Full compensation is effected by the compensator slab 68 whose size also increases with increasing temperature. Clamped at one end, the compensator expands inwardly so as to further decrease the width of the air gap. By suitable selection of materials and lengths, the net change in resonant frequency of the cavity as a function of frequency can be reduced to zero at the wavelength of interest.

To tune the etalon, the entire structure is rotated so that the cavity mirrors are not normal to the light direction. Thus, both tuning and thermal compensation can be achieved by totally passive means.

In all cases it is understood that the above-described arrangements are illustrative of but a small number of the many possible specific embodiments which can represent applications of the principles of the invention. For example, in the embodiment of FIG. 5 the clamps can be glued to the etalon slab and the compensator slab. Alternatively, the compensator slab and the clamp can be threaded so that the slab can be screwed into position. Thus, numerous and varied other arrangements can readily be devised by those skilled in the art.

What is claimed is:

1. A Fabry-Perot etalon comprising:
 a region of solid material and an air gap located between, and bounded by a pair of partially reflecting surfaces;
 passive means for tuning said etalon;
 and passive compensator means, responsive to changes in temperature, for varying the optical length of said air gap in a sense to minimize any temperature induced changes in the length of said etalon.

2. The etalon according to claim 1 wherein:
 said solid material is a slab, and said compensator is a slab;
 and wherein said air gap is formed between said etalon slab and said compensator slab.

3. The etalon according to claim 2 wherein:
 a first partially reflecting surface is located along one side of said etalon slab;
 a second partially reflecting surface is located along one side of said compensator;
 said one side of said compensator being adjacent to said air gap;
 pliable means, located between said slabs, for maintaining said air gap;
 and clamping means for forcing said slabs toward each other.

4. The etalon according to claim 3 including means for tilting the planes of said reflecting surfaces relative to the direction of light propagation.

5. The etalon according to claim 1 wherein said region of solid material is a section of optical fiber.

6. The etalon according to claim 1 wherein said region of solid material is a slab.

7. The etalon according to claim 1 wherein:
 said region of solid material is a length of optical fiber embedded in a rotary connector capillary;
 said passive compensator means includes input and output fiber sections coupled to said etalon and embedded in sections of rotary connector capillaries;
 and a spacing sleeve for maintaining the ends of said capillaries in fixed positions relative to said etalon.

8. A Fabry-Perot etalon comprising:
 a fixed length of optical fiber embedded in a rotary capillary tube and an air gap disposed between a pair of partially reflecting surfaces;
 one of said reflecting surfaces being disposed between an end of said fixed length of fiber located away from said air gap, and an end of a second fiber;
 the second reflecting surface being disposed across an end of a third fiber located adjacent to said air gap and opposite the other end of said length of fiber;
 said second and third fibers being embedded in sections of connector capillary tubes whose diameters abruptly increase from a first value adjacent to said etalon to a second larger value at distances away from said etalon, forming a pair of annular steps;
 and an annular spacing sleeve disposed along said etalon between said steps.

9. The etalon according to claim 8 wherein the distance $L_1$ between said one reflecting surface and its nearest step, and the distance $L_2$ between said second reflecting surface and its nearest step are selected to minimize the changes in the optical length of said etalon at a given operating frequency as a function of temperature.

10. The etalon according to claim 9 including a U shaped assembly bracket having first and second apertures for receiving said connector capillaries including said second and third fibers;
 said apertures being large enough to form a slide fit and thereby to permit said capillaries to move longitudinally within said apertures;
 said capillaries further have shoulders disposed therealong between said apertures and said etalon;
 and springs located between said apertures and said shoulders thereby forcing said spacing sleeve to make contact with said annular steps.

11. The etalon according to claim 10 including:
 an aligning sleeve extending between said capillaries for aligning all of said fibers;
 and means pressing against the side of aligning sleeve for tuning said etalon.

* * * * *